Dec. 8, 1959  E. P. LEWIS ET AL  2,916,361
REACTOR

Filed Aug. 10, 1956  3 Sheets-Sheet 1

INVENTORS
Edmund Philip Lewis,
Emerson W. Skelton and
Peter W. F. Cochrane

By Stevens, Davis, Miller and Mosher
ATTORNEYS

Dec. 8, 1959    E. P. LEWIS ET AL    2,916,361
REACTOR

Filed Aug. 10, 1956    3 Sheets-Sheet 2

INVENTORS
Edmund Philips Lewis,
Emerson W. Skelton and
Peter W. F. Cochrane
By Stevens, Davis, Miller & Mosher
ATTORNEYS Dec. 8, 1959      E. P. LEWIS ET AL      2,916,361

REACTOR

Filed Aug. 10, 1956      3 Sheets-Sheet 3

INVENTORS
Edmund Philips Lewis,
Emerson W. Skelton &
Peter W. F. Cochrane.

By Stevens, Davis, Miller and Mosher
ATTORNEYS

United States Patent Office 2,916,361
Patented Dec. 8, 1959

2,916,361

REACTOR

Edmund Philips Lewis, Emerson W. Skelton, and Peter W. F. Cochrane, all of Sarnia, Ontario, Canada, assignors to Polymer Corporation Limited, Sarnia, Ontario, Canada, a corporation of Canada Application August 10, 1956, Serial No. 603,399

6 Claims. (Cl. 23—288)

This invention relates to fluid distribution means. It relates generally to a system in which a stream of fluid, at a relatively high velocity and of a relatively small cross-section is passed through a distributor whereby it is converted to a stream of fluid at a relatively low velocity and of a larger cross-section and in which the fluid then impinges upon a bed of mechanically weak contact material. While such conversion occurs in many catalytic processes, ion exchange processes and drying processes common in the chemical industry, a special need arose in the system in which the fluid consisted of a mixture of n-butylene and steam which was to be passed through a mechanically weak catalyst to dehydrogenate the n-butylene to butadiene-1,3.

It is now well known to dehydrogenate n-butylene to butadiene-1,3 in the presence of steam, and of a catalyst the active ingredient of which is calcium nickel phosphate, and at a temperature of 950–1350° F. One example of a suitable catalyst is the one disclosed and claimed in United States Patent No. 2,442,320, issued May 25, 1948, to Andrew J. Dietzler et al. Such catalyst is normally used in the form of pellets which are mechanically relatively weak.

It has already been appreciated that the hydrocarbon should have a short residence time in the dehydrogenation reactor prior to passage through the catalyst and also should have a short contact time during passage through the catalyst in order to avoid undue destructive decomposition of the hydrocarbon. The shortening of the residence time of the hydrocarbon prior to its passage through the catalyst has been minimized for example by thermocompressors, as in United States Patent No. 2,399,560, issued April 30, 1946, to E. V. Murphree.

In an alternative method, proposed by the present applicants to shorten both the residence time and the contact time, a mixture of steam and hydrocarbon is admitted to the reactor at a relatively high velocity through a central pipe. However, since the catalyst is mechanically relatively weak, the high velocity gases would tend to pulverize the catalyst. It has been found that such pulverized catalyst causes an undesirably high pressure drop through the bed. Hence, means have been sought whereby to transform the gas stream from one of high velocity to one of low velocity and larger cross-section while such gas stream is passing through a short distance.

It was attempted to solve such problem by affixing to the end of the gas inlet downcomer a flow distributor which was intended to diffuse the small diameter high velocity stream, in a very short distance, to a low velocity stream of large diameter. A flow distributor was used which consisted merely of a primary annular deflecting plate immediately below the downcomer which served to force the single gaseous stream partially to leave the distributor through a plurality of apertures in the wall thereof above said deflecting plate and partially to leave through a perforated base plate, below the primary plate and substantially parallel thereto, which served further to break up the steam emerging from the primary plate by forcing it to exit through apertures in the wall of the distributor between the primary plate and base plate and through the perforations in the base plate.

It was generally the practice to retain the catalyst bed in position by means of a hold-down screen with a layer of inert material, usually Raschig rings, disposed between the catalyst and the screen. The screen usually consisted of a plurality of relatively narrow strips of screen material, held together by means of connecting wires to form a screen covering the entire surface of the bed. It was found that with the flow distributor described hereinabove, there was still a tendency for the hold-down screen to be disrupted during the course of the contacting operation. Such disruption resulted from a breakage of the connecting wires. Such movement of the screen resulted in agitation and pulverization of the catalyst. The pulverized catalyst is generally unsatisfactory since, firstly, some catalysts are chemically unsuitable for use when in powdered form; secondly, the powder tends to clog the interstices in the bed and results in a dangerous pressure build-up within the reactor, and thirdly, such disruption appears to be indicative of a back flow of reactants which represents an undesirable increase in the residence time of the reactants.

It is an object, therefore, of the present invention to disclose a distributor which converts a stream of fluid from one of a relatively high velocity and relatively small cross-section to one of relatively low velocity and larger cross-section.

It is a further object of the present invention to disclose a distributor which satisfactorily distributes gaseous reactants above a bed of mechanically weak contact material with the residence time above the bed kept as short as possible.

These and other objects of the present invention are achieved in a distributor for use in a reaction vessel consisting of a shell containing a static bed of contact material and equipped with inlet and outlet means a funnel comprising a downcomer attached to the inlet means and a frusto conical hood surrounding the discharge end of the downcomer and lying adjacent the periphery of said bed, said distributor being adapted to be connected to the discharge end of said inlet means, or to the downcomer, and comprising primary annular plate means positioned to deflect only that fluid discharged from the peripheral area of the discharge end of the inlet means, secondary plate means located downstream of the primary plate means positioned for intercepting fluid discharged from the central area of the discharge end of the inlet means and a perforated envelope enclosing the discharge end of the inlet means and said upper and bottom plate means. In a suitable form of the invention, the primary plate means is an upper annular deflecting plate coaxial with the longitudinal axis of the inlet means, the plane of said plate lying in a plane transverse to said axis downstream of the discharge end of the inlet means to project inwardly into the path of fluid discharged from the discharge end and extending outwardly as far as the imaginary continuation of the surface of the discharge end of the inlet means. The secondary plate means usually consists of a perforated bottom plate having the same polar axis as the upper plate and the inlet means and extending outwardly either as far as the upper plate or as far as the perforated envelope. The perforated envelope usually consists of a cylindrical fine wire mesh. The bottom of such cylindrical envelope is usually connected to the bottom plate.

One modification of the present invention resides in locating a plurality of circumferentially spaced partitions, either between the primary (upper) plate and the secondary (bottom) plate or between the mouth of the downcomer and the lower plate, or both, such partial walls extending radially a distance dependent upon their position. If they are located between the primary (upper) and secondary (bottom) plates, they generally extend radially from the inner diameter of the upper plate to the cylindrical wire mesh envelope; if they are located between the mouth of the downcomer and the primary (upper) plate they extend radially from the outside diameter of the downcomer to the cylindrical mesh envelope.

The radial position of the envelope is not critical but best results are obtained when the envelope is spaced from the downcomer or its imaginary extension by a distance of the order of the distance from the primary (upper) annular deflecting plate to the mouth of the inlet pipe. When the partitions are thin, the envelope can be joined to them. However, when the partitions have appreciable thickness, it is advantageous to have a space between the screen and the outer extremity of the partitions equal to at least twice the thickness of the partitions. The character of the screen may vary widely in the practice of the invention but optimum results are obtained using a screen having a pressure drop of two velocity heads. The ratio of mesh size to wire diameter may vary over a range but the preferred ratio is of the order of eleven.

The invention will now be described with reference to the drawings, in which

Figure 1:
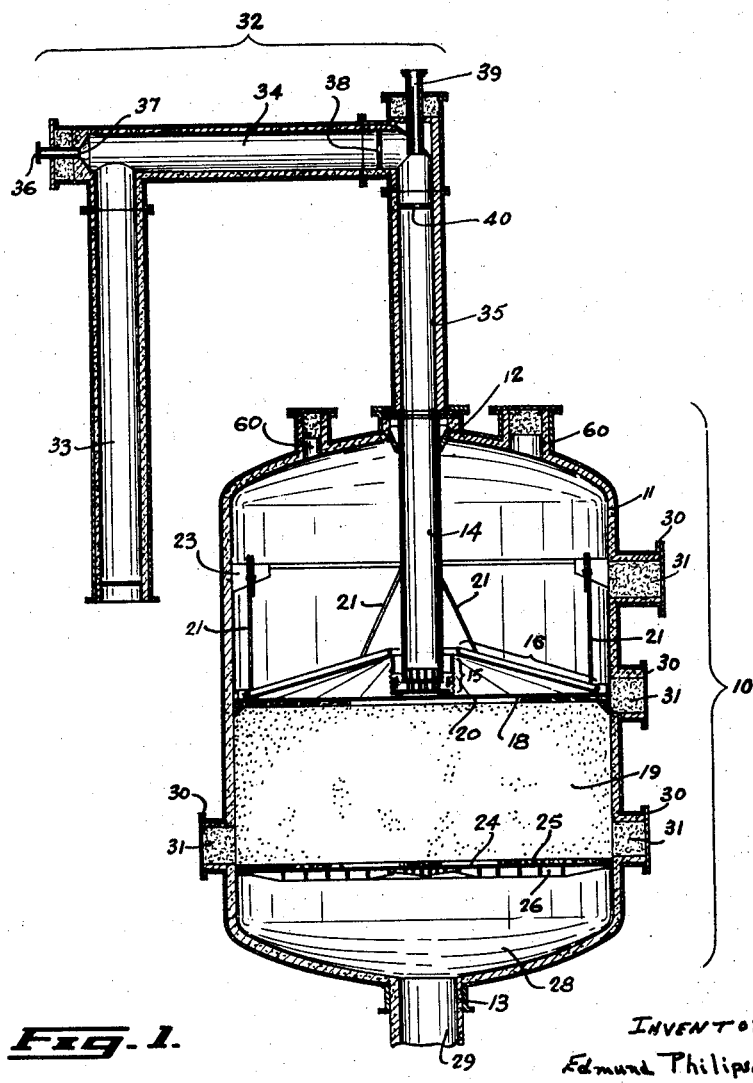
Fig. 1 is a section of the reaction vessel showing a gas injection system, a hood, and an embodiment of the novel distributor of the present invention.
Figure 2:
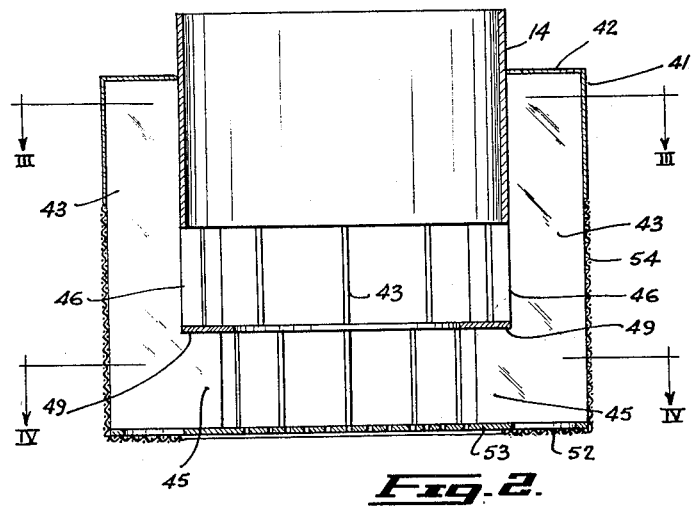
Fig. 2, is a central vertical sectional elevation along the line 2—2 of Figs. 3 and 4 of the embodiment of the invention shown generally in Fig. 1.
Figure 3:
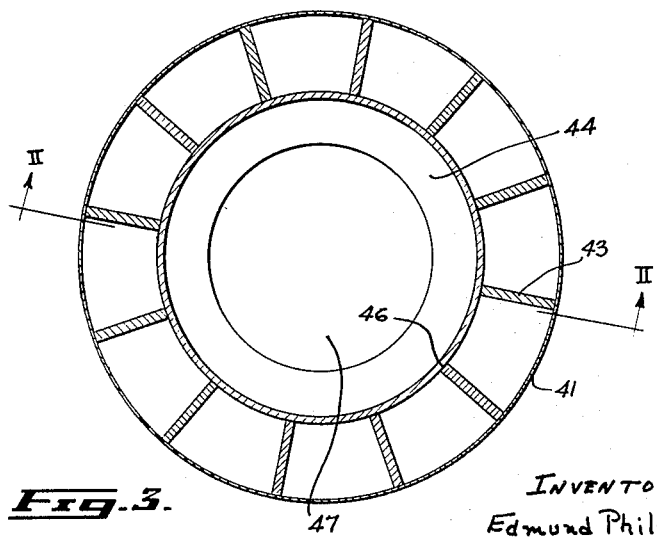
Fig. 3 is a section along line 3—3 of Fig. 2.
Figure 4:
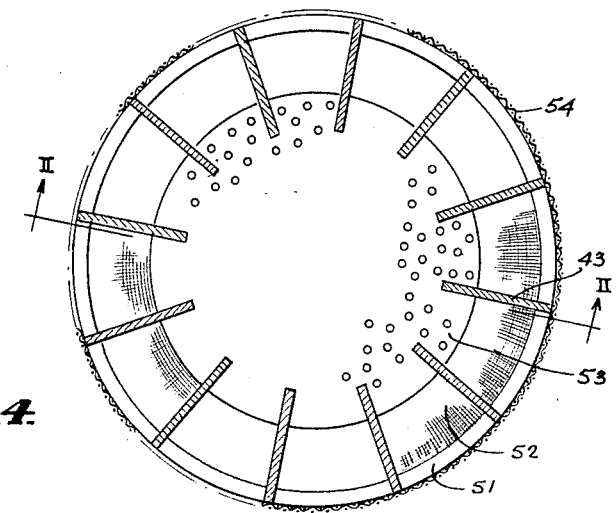
Fig. 4 is a section along line 4—4 of Fig. 2.
Figure 5:
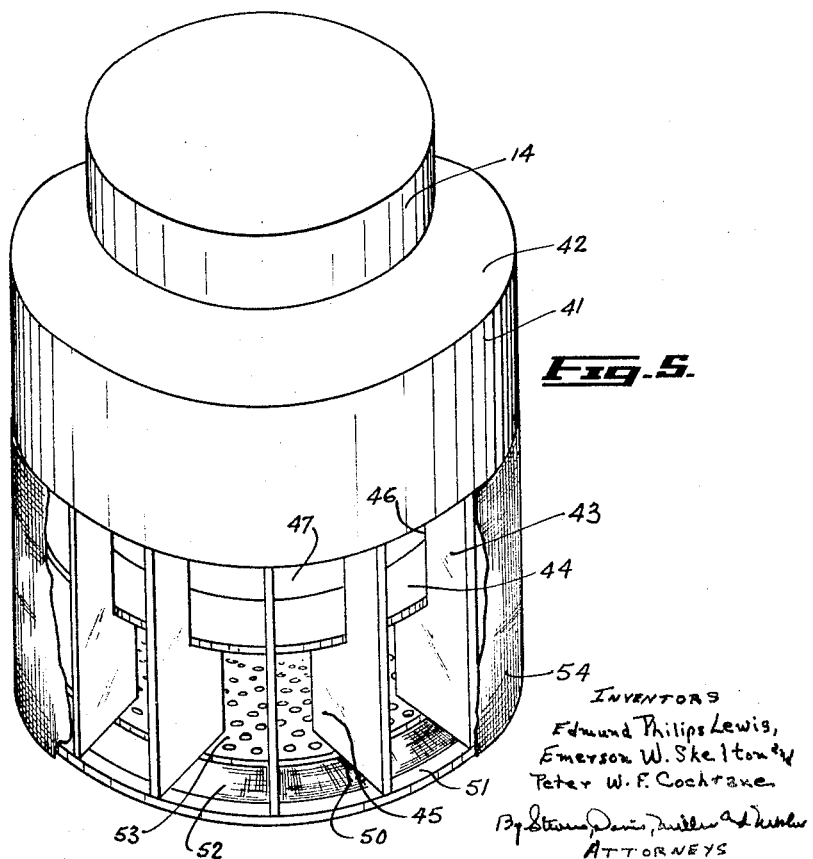
Fig. 5 is a perspective view, partly broken away, of the embodiment shown in Figs. 1–4.

The reaction vessel associated with the distributor of the present invention is shown in Fig. 1. The reaction vessel itself is designated generally as 10 and consists of an insulated shell 11 equipped with manways 30 fitted with insulated plugs 31. Attached to inlet pipe 35 through the inlet port 12 is downcomer 14.

The inlet system is designated generally by numeral 32. That system allows any two or all three of three different fluids to be intimately mixed prior to admission to the reaction vessel through the distributor of the present invention. In one particular case, that of the dehydrogenation of n-butylene to butadiene-1,3 in the presence of a calcium nickel phosphate-chromium oxide catalyst, the reaction is a cyclic one. During one phase a mixture of n-butylene and steam is passed through the catalyst in order to dehydrogenate the n-butylene to butadiene-1,3. During alternate phases, a mixture of steam and air is passed through the catalyst in order to burn off deposited coke, and so to regenerate the catalyst. The system consists of steam pipe 33, connecting pipe 34 and inlet pipe 35. The connecting pipe 34 has an air inlet pipe 36 with its port 37, and an orifice 38. The inlet pipe 35 has a hydrocarbon inlet pipe 39 and an orifice 40.

The operation of the inlet system during dehydrogenation is as follows: steam passes along pipe 33, through pipe 34 and through orifice 38 where it is intimately mixed with hydrocarbon entering pipe 35 from pipe 39. The mixture is further mixed during passage through orifice 40, and the mixture passed into downcomer 14.

During regeneration the inlet system operates as follows: steam passes along pipe 33 to pipe 34 where it is mixed with air entering through pipe 36. It is further mixed by passage through orifices 38 and 40 and is then passed into downcomer 14.

Downcomer 14 terminates in the distributor of the present invention, shown generally as 15 and surrounded by a hood designated generally as 16. Hood 16 rests upon hold-down screen 18, which is separated from the bed of contact material 19 by Raschig rings 20. Since the hood 16 rests on the bed of contact material, the hood is raised and lowered as the contact material expands and contracts. In order to prevent the hood from becoming distorted or displaced as it is raised and lowered, hairpin shaped hangers 21 are provided which as the desired downward limit of travel of the hood engage radial directed brackets 23, said hangers being hinged to the hood. Ring 22 adds support to the brackets and prevents hangers 21 from falling inwardly.

The bed of contact material rests on a layer of inert material 25 which may conveniently be Berl saddles. Such material is supported by a screen 24 which rests on grate 26. The fluid material leaves the vessel through grate 26, space 28, outlet port 13 and thence to outlet pipe 29.

One embodiment of the present invention is shown in greater detail in Figs. 2, 3, 4 and 5. The distributor consists of a cylindrical shell 41 with an annular cover 42 integral therewith, concentric with downcomer 14 and spaced therefrom by radiating, circumferentially spaced reinforcing partitions 43. Below the downcomer 14 and concentric therewith is annular deflecting plate 44, whose lower surface rests upon the inwardly radial extension of seat designated generally as 45 of the partitions 43. The deflecting plate 44 extends inwardly into the path of fluid discharged from the peripheral area of the discharge end of the downcomer to define a central aperture 47 which lies immediately below the open bottom of the downcomer but which is of smaller diameter. This plate 44 does not extend outwardly beyond the imaginary continuation of the surface of the discharge end of the downcomer, such imaginary continuation being bounded by edges 46 of partitions 43.

Abutting the low portions 50 of partitions 43 is a flat, bottom ring 51, an annular wire mesh screen 52 concentric therewith and having an outer diameter substantially equal to the inner diameter of ring 51, and, concentric with both the ring 51 and the screen 52, a perforated bottom deflecting plate 53 whose diameter is substantially equal to the inner diameter of screen 52. Enclosing the open cylindrical wall of the distributor is a wire mesh screen envelope 54.

While it is not desired to limit the operation of the present invention to any particular theory, it is believed that the faults of the prior distributors were due to the fact that streams of high velocity gas escaped radially and downwardly from the distributor. In the present case, it is believed that a perforated member, such as for example wire mesh, situated adjacent each of the ports through which such high velocity gaseous streams escape so as to be in the path of gas passing therethrough serves to reduce the velocity of the gas sufficiently so that the gas impinging on the catalyst bed does not have a deleterious effect. Although only a wire mesh screen has been disclosed, other perforated members may also be employed providing they have the pressure drop and ratio of opening to obstruction resulting in the desired characteristics. An example of such other perforated member is a honeycomb material. Also, although only one wire mesh envelope has been shown, it is possible to use two concentric screen envelopes, each having a relatively low pressure drop and separated radially by a space equal to at least ten wire diameters. The character of the screen greatly influences the effectiveness of the wire mesh envelope of the present invention, and it has been found that optimum results are obtained using a screen having a pressure drop of two velocity heads.

What we claim is:

1. In a reaction vessel for the catalytic dehydrogenation of a gaseous stream of olefins having at least 4 carbon atoms in the olefinic chain, said vessel consisting essentially of a shell containing a static bed of contact material and equipped with inlet means for admitting an axially moving stream of said gas having a high velocity but relatively small cross-sectional area, outlet means and a funnel, said funnel comprising a downcomer attached to the inlet means and a frusto-conical hood surrounding the discharge end of said downcomer and lying adjacent the periphery of said bed, the combination, with the discharge end of said downcomer, of a distributor, designed to convert the high velocity stream having a small cross sectional area to one of low velocity and of large cross sectional area within a short distance, by the structure comprising: a first deflecting plate, said plate being annular and being positioned to deflect only that axially moving fluid discharged from the peripheral area of the discharge end of the downcomer and to convert said deflected stream to a radially moving stream, said plate projecting outwardly only as far as an imaginary continuation of the surface of the discharge end of said downcomer; a second deflecting plate located downstream of said first deflecting plate, said second deflecting plate being perforated and being positioned for intercepting fluid discharged from the central area of the discharge end of the downcomer for redirecting and converting a part of said axially moving stream of gas at a high velocity and of small cross sectional area radially outwardly through a series of ports to convert such stream to a plurality of radially outwardly directed streams of gas of lower velocity and distributed over a larger cross section while permitting the remainder of said axially moving stream of high velocity gas to pass through the perforations at a lower velocity; and a perforated envelope enclosing the discharge end of the downcomer and said first and second deflecting means, whereby the original axially flowing gaseous stream having high velocity and relatively low cross sectional area is converted to a stream consisting of axially flowing low velocity gases and radially flowing low velocity gases, the cross sectional area of said streams being greater than that of the original gas stream.

2. In a reaction vessel for the catalytic dehydrogenation of a gaseous stream of olefins having at least 4 carbon atoms in the olefinic chain, said vessel consisting essentially of a shell containing a static bed of contact material and equipped with inlet means for admitting an axially moving stream of said gas having a high velocity but relatively small cross-sectional area, outlet means and a funnel, said funnel comprising a downcomer attached to the inlet means and a frusto-conical hood surrounding the discharge end of said downcomer and lying adjacent the periphery of said bed, the combination, with the discharge end of said downcomer, of a distributor, designed to convert the high velocity stream having a small cross sectional area to one of low velocity and of large cross sectional area within a short distance, by the structure comprising: an upper deflecting plate coaxial with the longitudinal axis of said downcomer, said plate being annular, the plane of said plate lying in a plane transverse to said axis downstream of the discharge end of the downcomer to project inwardly of said discharge end and to project outwardly only as far as an imaginary continuation of the surface of such discharge end, in order to deflect only that axially moving gas discharged from the peripheral area of the discharge end of the downcomer and to convert said deflected streams to a radially moving stream; a bottom deflecting plate coaxial with said upper deflecting plate, placed downstream from and parallel to said upper plate, said bottom plate being perforated and lying in the path of gas discharged from the downcomer and undeflected from its original path by said upper plate for redirecting and converting a part of said axially moving stream of gas at a high velocity and of small cross sectional area radially outwardly through a series of ports to convert such stream to a plurality of radially outwardly directed streams of gas of lower velocity and distributed over a larger cross sectional area while permitting the remainder of said axially moving stream of high velocity gas to pass axially through the perforations at a lower velocity; and a cylindrical wire mesh envelope surrounding the discharge end of the downcomer and the upper plate and contiguous with the bottom plate, whereby the original axially flowing gaseous stream having high velocity and relatively low cross sectional area is converted to a stream consisting of axially flowing low velocity gases and radially flowing low velocity gases, the cross sectional area of said streams being greater than that of the original gas stream.

3. In a reaction vessel for the catalytic dehydrogenation of a gaseous stream of olefins having at least 4 carbon atoms in the olefinic chain, said vessel consisting essentially of a shell containing a static bed of contact material and equipped with inlet means for admitting an axially moving stream of said gas having a high velocity but relatively small cross-sectional area, outlet means and a funnel, said funnel comprising a downcomer attached to the inlet means and a frusto-conical hood surrounding the discharge end of said downcomer and lying adjacent the periphery of said bed, the combination, with the discharge end of said downcomer, of a distributor, designed to convert the high velocity stream having a small cross sectional area to one of low velocity and of large cross sectional area within a short distance, by the structure comprising: an upper deflecting plate coaxial with the longitudinal axis of the downcomer, said upper plate being annular, the plane of said plate lying in a plate transverse to said axis downstream of the discharge end of the downcomer to project inwardly into the path of fluid discharged from the peripheral area of the discharge end of said downcomer and to project outwardly only as far as an imaginary continuation of the surface of such discharge end, in order to deflect only that axially moving gas discharged from the peripheral area of the discharge end of the downcomer and to convert said deflected stream to a radially moving stream; a bottom deflecting plate coaxial with said upper deflecting plate, said bottom deflecting plate being perforated and spaced downstream from and parallel to said upper plate and lying in the path of fluid discharged from the downcomer undeflected from its original path by said upper plate for redirecting and converting a part of said axially moving stream of gas at a high velocity and of small cross sectional area radially outwardly through a series of ports to convert such stream to a plurality of radially outwardly directed streams of gas of lower velocity and distributed over a larger cross sectional area while permitting the remainder of said axially moving streams of high velocity gas to pass axially through the perforations at a lower velocity; and a cylindrical wire mesh envelope surrounding the discharge end of the downcomer and the upper plate and contiguous with the bottom plate, radially spaced from the periphery of the downcomer and from the imaginary continuation of the discharge end of the downcomer by a distance of the order of at least the amount by which the upper annular deflecting plate is placed downstream from the discharge end of the downcomer, whereby the original axially flowing gaseous stream having high velocity and relatively low cross sectional area is converted to a stream consisting of axially flowing low velocity gases and radially flowing low velocity gases, the cross sectional area of said streams being greater than that of the original gas stream.

4. In a reaction vessel for the catalytic dehydrogenation of a gaseous stream of olefins having at least 4 carbon atoms in the olefinic chain, said vessel consisting essentially of a shell containing a static bed of contact material and equipped with inlet means for admitting an axially moving stream of said gas having a high velocity but relatively small cross-sectional area, outlet means and a funnel, said funnel comprising a downcomer attached to the inlet means and a frusto-conical hood surrounding the discharge end of said downcomer and lying adjacent the periphery of said bed, the combination, with the discharge end of said downcomer, of a distributor, designed to convert the high velocity stream having a small cross sectional area to one of low velocity and of large cross sectional area within a short distance, by the structure comprising: an upper deflecting plate coaxial with the longitudinal axis of the downcomer, said upper deflecting plate being annular, the plane of said plate lying in a plane transverse to said axis downstream of the discharge end of the downcomer to project inwardly only into the path of gas discharged from the peripheral area of the discharge end of the downcomer and to project outwardly only as far as an imaginary continuation of the surface of the discharge end of the downcomer in order to deflect only that axially moving gas discharged from the peripheral area of the discharge end of the downcomer and to convert said deflected stream to a radially moving stream; a bottom deflecting plate coaxial with the upper deflecting plate, said bottom deflecting plate being perforated and placed downstream from and parallel to said upper deflecting plate, said bottom plate lying in the path of fluid discharged from the downcomer and undeflected from its original path by said upper plate for redirecting and converting a part of said axially moving stream of gas at a high velocity and of small cross sectional area radially outwardly through a series of ports to convert such stream to a plurality of radially outwardly directed streams of gas of lower velocity and distributed over a larger cross sectional area while permitting the remainder of said axially moving stream of high velocity gas to pass axially through the perforations at a lower velocity; a cylindrical wire mesh envelope surrounding the discharge end of the downcomer and the upper plate and contiguous with the bottom plate; radially spaced from the periphery of the downcomer and from the imaginary continuation of the surface of the discharge end of the downcomer by a distance by the order of at least the amount by which the upper deflecting plate is spaced downstream from the discharge end of the downcomer; and a plurality of circumferentially spaced partitions located between the upper deflecting plate and the bottom deflecting plate and extending radially from the inner periphery of the upper deflecting plate to the periphery of the wire mesh envelope whereby the original axially flowing gaseous stream having high velocity and relatively low cross sectional area is converted to a stream consisting of axially flowing low velocity gases and radially flowing low velocity gases, the cross sectional area of said streams being greater than that of the original gas stream.

5. In a reaction vessel for the catalytic dehydrogenation of a gaseous stream of olefins having at least 4 carbon atoms in the olefinic chain, said vessel consisting essentially of a shell containing a static bed of contact material and equipped with inlet means for admitting an axially moving stream of said gas having a high velocity but relatively small cross-sectioned area, outlet means and a funnel, said funnel comprising a downcomer attached to the inlet means and a frusto-conical hood surrounding the discharge end of said downcomer and lying adjacent the periphery of said bed, the combination, with the discharge end of said downcomer, of a distributor, designed to convert the high velocity stream having a small cross sectional area to one of low velocity and of large cross sectional area within a short distance, by the structure comprising: an upper deflecting plate coaxial with the longitudinal axis of the downcomer, said upper deflecting plate being annular, the plane of said plate lying in a plane transverse to said axis downstream of the discharge end of the downcomer to project inwardly only into the path of gas discharged from the peripheral area of the discharge end of the downcomer and to project outwardly only as far as an imaginary continuation of the surface of the discharge end of the downcomer in order to deflect only that axially moving gas discharged from the peripheral area of the discharge end of the downcomer and to convert said deflected stream to a radially moving stream; a bottom deflecting plate coaxial with the upper deflecting plate, said bottom deflecting plate being perforated and placed downstream from and parallel to said upper deflecting plate, said bottom plate lying in the path of fluid discharged from the downcomer and undeflected from its original path by said upper plate for redirecting and converting a part of said axially moving stream of gas at a high velocity and of small cross sectional area radially outwardly through a series of ports to convert such stream to a plurality of radially outwardly directed streams of gas of lower velocity and distributed over a larger cross sectional area while permitting the remainder of said axially moving stream of high velocity gas to pass axially through the perforations at a lower velocity; a cylindrical wire mesh envelope surrounding the discharge end of the downcomer and the upper plate and contiguous with the bottom plate; radially spaced from the periphery of the downcomer and from the imaginary continuation of the surface of the discharge end of the downcomer by a distance by the order of at least the amount by which the upper deflecting plate is spaced downstream from the discharge end of the downcomer; and a plurality of circumferentially placed partitions, located between the upper deflecting plate and the mouth of the downcomer, extending radially from the inner periphery of the upper deflecting plate to the periphery of said wire mesh envelope, whereby the original axially flowing gaseous stream having high velocity and relatively low cross sectional area is converted to a stream consisting of axially flowing low velocity gases and radially flowing low velocity gases, the cross sectional area of said streams being greater than that of the original gas stream.

6. In a reaction vessel for the catalytic dehydrogenation of a gaseous stream of olefins having at least 4 carbon atoms in the olefinic chain, said vessel consisting essentially of a shell containing a static bed of contact material and equipped with inlet means for admitting an axially moving stream of said gas having a high velocity but relatively small cross-sectional area, outlet means and a funnel, said funnel comprising a downcomer attached to the inlet means and a frusto-conical hood surrounding the discharge end of said downcomer and lying adjacent the periphery of said bed, the combination, with the discharge end of said downcomer, of a distributor, designed to convert the high velocity stream having a small cross sectional area to one of low velocity and of large cross sectional area within a short distance, by the structure comprising: an upper deflecting plate coaxial with the longitudinal axis of the downcomer, said upper deflecting plate being annular, the plane of said plate lying in a plane transverse to said axis downstream of the discharge end of the downcomer to project inwardly only into the path of gas discharged from the peripheral area of the discharge end of the downcomer and to project outwardly only as far as an imaginary continuation of the surface of the discharge end of the downcomer in order to deflect only that axially moving gas discharged from the peripheral area of the discharge end of the downcomer and to convert said deflected stream to a radially moving stream; a bottom deflecting plate coaxial with the upper deflecting plate, said bottom deflecting plate being perforated and placed downstream from and parallel to said upper deflecting plate, said bottom plate lying in the path of fluid discharged from the downcomer and undeflected from its original path by said upper plate for redirecting and converting a part of said axially moving stream of gas at a high velocity and of small cross sectional area radially outwardly through a series of ports to convert such stream to a plurality of radially outwardly directed streams of gas of lower velocity and distributed over a larger cross sectional area while permitting the remainder of said axially moving stream of high velocity gas to pass axially through the perforations at a lower velocity; a cylindrical wire mesh envelope surrounding the discharge end of the downcomer and the upper plate and contiguous with the bottom plate; radially spaced from the periphery of the downcomer and from the imaginary continuation of the surface of the discharge end of the downcomer by a distance by the order of at least the amount by which the upper deflecting plate is spaced downstream from the discharge end of the downcomer; and a plurality of circumferentially spaced partitions located between the mouth of the downcomer and the bottom deflecting plate, extending radially from the inner periphery of the upper deflecting plate to the periphery of the wire mesh envelope, whereby the original axially flowing gaseous stream having high velocity and relatively low cross sectional area is converted to a stream consisting of axially flowing low velocity gases and radially flowing low velocity gases, the cross sectional area of the said streams being greater than that of the original gas stream.

References Cited in the file of this patent

UNITED STATES PATENTS

| | | |
|---|---|---|
| 1,877,046 | Phillips | Sept. 13, 1932 |
| 1,995,400 | Schultz | Mar. 26, 1935 |
| 2,483,923 | Morsey | Oct. 4, 1949 |
| 2,483,948 | Underwood | Oct. 4, 1949 |
| 2,767,066 | Zimmerman | Oct. 16, 1956 |

FOREIGN PATENTS

| | | |
|---|---|---|
| 492,731 | France | Apr. 1, 1919 |